United States Patent
Sakurai et al.

(10) Patent No.: US 9,692,976 B2
(45) Date of Patent: Jun. 27, 2017

(54) IMAGING APPARATUS WITH SHAKE CORRECTION FUNCTION

(71) Applicant: Panasonic Intellectual Property Management Co., Ltd., Osaka (JP)

(72) Inventors: Mikio Sakurai, Osaka (JP); Michio Kishiba, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 132 days.

(21) Appl. No.: 14/667,732

(22) Filed: Mar. 25, 2015

(65) Prior Publication Data

US 2015/0281581 A1    Oct. 1, 2015

(30) Foreign Application Priority Data

Mar. 28, 2014 (JP) ................... 2014-070363
Jan. 22, 2015 (JP) ................... 2015-009925

(51) Int. Cl.
| H04N 5/228 | (2006.01) |
| --- | --- |
| G03B 17/00 | (2006.01) |
| H04N 5/232 | (2006.01) |
| G02B 27/64 | (2006.01) |
| H04N 5/225 | (2006.01) |

(52) U.S. Cl.
CPC ....... *H04N 5/23287* (2013.01); *G02B 27/646* (2013.01); *H04N 5/23258* (2013.01)

(58) Field of Classification Search
CPC ........... H04N 5/23287; H04N 5/23209; H04N 5/23258; G02B 27/646
See application file for complete search history.

(56) References Cited

U.S. PATENT DOCUMENTS

| 6,154,611 | A * | 11/2000 | Washisu ............... | G02B 27/646 348/E5.046 |
| --- | --- | --- | --- | --- |
| 8,155,512 | B2 * | 4/2012 | Honjo ..................... | G03B 5/00 348/208.16 |
| 2005/0140793 | A1 | 6/2005 | Kojima et al. | |

FOREIGN PATENT DOCUMENTS

| JP | 2005-189654 | 7/2005 |
| --- | --- | --- |
| JP | 2009-251492 | 10/2009 |

* cited by examiner

*Primary Examiner* — Twyler Haskins
*Assistant Examiner* — Carramah J Quiett
(74) *Attorney, Agent, or Firm* — Wenderoth, Lind & Ponack, L.L.P.

(57) ABSTRACT

An imaging apparatus has one of the interchangeable lens and the camera body acting as a master and the other acting as a slave. The master has a shake detection unit configured to detect a shake of the camera body and/or the interchangeable lens; and a shake correction processing unit configured to calculate an amount of shake correction for the correction lens and the imaging device based on an output from the shake detection unit. The shake correction processing unit performs arithmetic processing for calculating a shake correction signal and separates the shake correction signal into a low frequency domain and a high frequency domain. One of the lens driving unit and the device driving unit performs the image blur correction based on the shake correction signal of the high frequency domain, and the other performs the image blur correction based on the shake correction signal of the low frequency domain.

5 Claims, 12 Drawing Sheets

IMAGING APPARATUS WITH SHAKE CORRECTION FUNCTION

BACKGROUND

Technical Field

The present disclosure relates to an imaging apparatus that has a shake correction function in both of an interchangeable lens and a camera body.

Description of the Related Art

There have been imaging apparatuses that are provided with a detection unit (a gyro sensor or the like) which detects a shake of the imaging apparatus. Interchangeable-lens cameras as the imaging apparatuses have the detection unit such as a gyro sensor which detects a shake of the imaging apparatus provided at least in one of the interchangeable lens and the camera body as described in, for example, Patent Literature 1. In the camera which has the detection unit provided in the interchangeable lens, the camera shifts a position of a shake correction lens provided in the interchangeable lens based on the detection result from the detection unit. On the other hand, in the camera which has the detection unit provided in the camera body, the camera shifts a position of an imaging device (an image sensor) provided in the camera body based on the detection result from the detection unit.

Those types of the imaging apparatus reduce influences of the camera shake on a captured image by detecting vibrations in a frequency band around 1 Hz to 10 Hz transmitted from user's hands and by driving lenses in the interchangeable lens or an imaging sensor in the camera body or both of the lenses and the imaging sensor based on the detection result.

CITATION LIST

Patent Literature

PTL 1: Unexamined Japanese Patent Publication No. 2009-251492

SUMMARY

The present disclosure provides an imaging apparatus capable of effectively using a shake correction range.

According to a first aspect of the present disclosure, an imaging apparatus which has an interchangeable lens and a camera body with one of the interchangeable lens and the camera body acting as a master and the other acting as a slave is provided. The interchangeable lens includes a correction lens configured to correct an image blur; and a lens driving unit configured to perform image blur correction by moving the correction lens in a plane perpendicular to an optical axis. The camera body includes an imaging device configured to generate image data by imaging an object image which is formed by the interchangeable lens; and a device driving unit configured to perform image blur correction by moving the imaging device in a plane perpendicular to the optical axis. The imaging apparatus has, at one of the interchangeable lens and the camera body, which acts as the master, a shake detection unit configured to detect a shake of at least one of the camera body and the interchangeable lens; and a shake correction processing unit configured to calculate an amount of shake correction for the correction lens and the imaging device based on an output from the shake detection unit.

The shake correction processing unit performs arithmetic processing for calculating a shake correction signal and separates the shake correction signal into a low frequency domain and a high frequency domain. One of the lens driving unit and the device driving unit performs the image blur correction based on the shake correction signal of the high frequency domain. The other of the lens driving unit and the device driving unit performs the image blur correction based on the shake correction signal of the low frequency domain.

According to a second aspect of the present disclosure, an interchangeable lens to be mounted to a camera body is provided. The interchangeable lens has a correction lens configured to correct an image blur; a shake detection unit configured to detect a shake at least one of the camera body and the interchangeable lens and output a shake detection signal; a lens driving unit configured to perform image blur correction by moving the correction lens in a plane perpendicular to an optical axis based on the detection signal; and a communication unit configured to transmit to the camera body a low-frequency shake correction signal which is generated as a result of cutting of a predetermined high-frequency component in the shake correction signal.

DETAILED DESCRIPTION

Exemplary embodiments of the present disclosure will be described below with reference to the drawings as required.

However, an unnecessary part of the detailed description about the prior art and substantially the same configuration may be omitted. That is for simplicity of the description. The inventors provide the following description and the accompanying drawings for those skilled in the art to fully understand the present disclosure and do not intend to limit the subject matter of the claims to the description and the drawings. The imaging apparatus will be exemplified by a digital camera below.

First Exemplary Embodiment

The digital camera according to the first exemplary embodiment has a shake correction function that reduces influences of a shake of the digital camera on a captured image in both of an interchangeable lens and a camera body. Specifically, in the interchangeable lens, the shake correction function reduces the influences of the shake by causing a shake detection unit such as a gyro sensor to detect a shake, causing a shake correction processing unit to calculate a shake correction signal, and moving a shake correction lens in a plane perpendicular to an optical axis of an optical system according to a shake in a high frequency domain of the shake correction signal. On the other hand, in the camera body, the shake correction function reduces the influences of the shake by moving an image sensor such as a CCD in a plane perpendicular to the optical axis of the optical system according to a shake in a low frequency domain of the shake correction signal calculated by the shake correction processing unit. A configuration and operations of the digital camera according to the present exemplary embodiment will be described in detail below.

In the description below, a function of correcting a shake by shifting the shake correction lens in the interchangeable lens will be referred to as an "OIS (Optical Image Stabilizer) function". Further, a function of correcting a shake by shifting an imaging device in the camera body will be referred to as a "BIS (Body Image Stabilizer) function". It is assumed that digital camera 1 according to the first exemplary embodiment has the OIS function able to correct a shake with higher accuracy as compared to the BIS function. In this context, whether the function is able to correct a shake with high accuracy or not is determined on the basis of whether the function is subject to a small follow-up residual difference for the shake correction signal or not, for example, whether the function has good follow-up capability and responsibility to a high-frequency component or not.

1. Configuration

Figure 1:
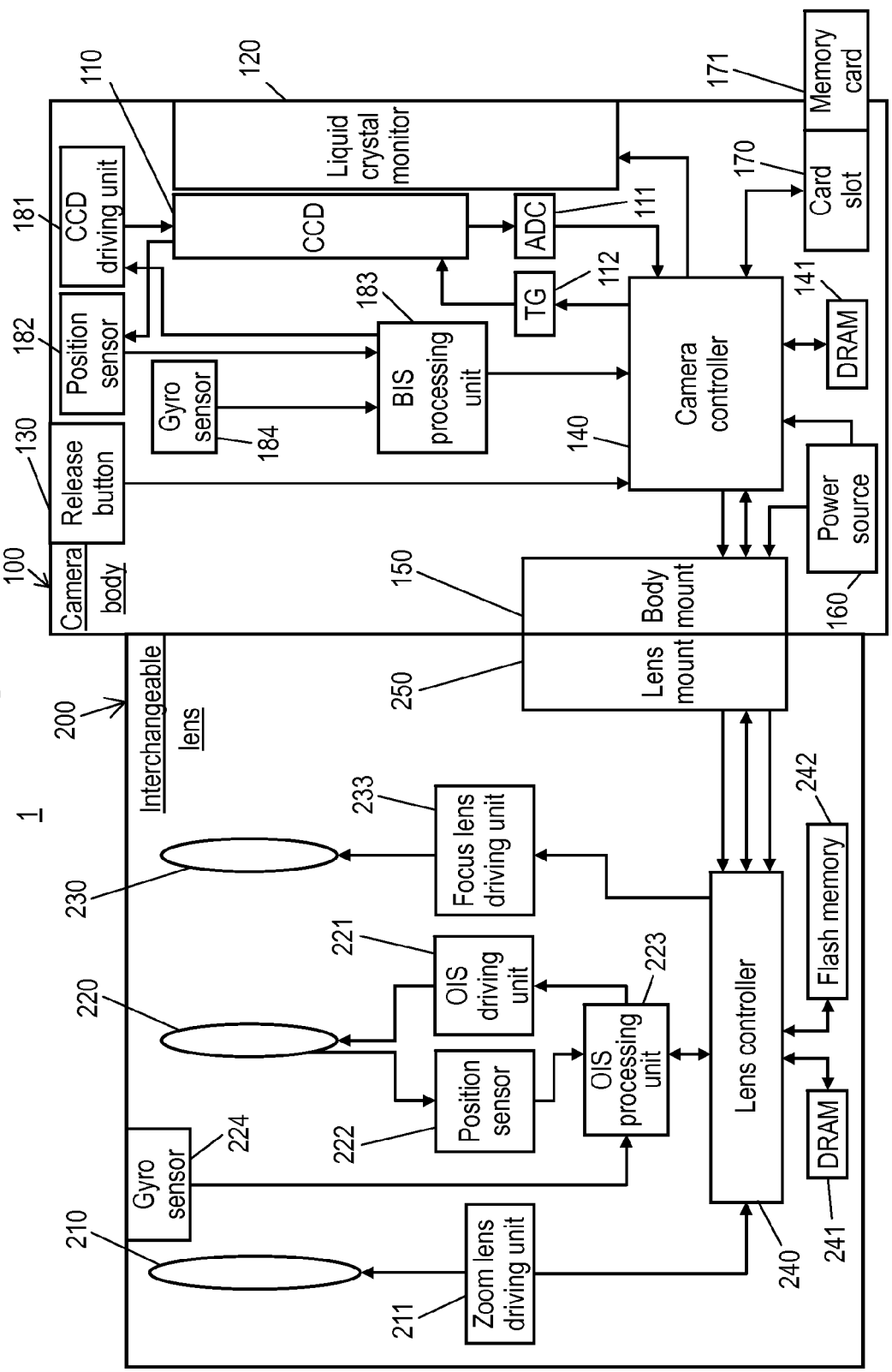
FIG. 1 is a block diagram illustrating a configuration of a digital camera according to a first exemplary embodiment.

FIG. 1 is a block diagram illustrating a configuration of the digital camera according to the first exemplary embodiment. Digital camera 1 includes camera body 100 and interchangeable lens 200 detachably fixed to camera body 100.
1-1. Camera Body
Camera body 100 has CCD 110, liquid crystal monitor 120, camera controller 140, body mount 150, power source 160, and card slot 170.

Camera controller 140 controls an overall operation of digital camera 1 by controlling the respective structural elements constituting camera body 100 and interchangeable lens 200 in addition to CCD 110 in response to a user operation on release button 130 which functions as a reception unit configured to receive a photographing instruction from a user. Camera controller 140 transmits a vertical synchronizing signal to timing generator 112. In parallel to that process, camera controller 140 generates an exposure synchronizing signal. Camera controller 140 periodically transmits the generated exposure synchronizing signal to lens controller 240 via body mount 150 and lens mount 250. Camera controller 140 uses DRAM 313 as a work memory in performing a control operation or an image processing operation.

CCD 110 generates image data by imaging an object image which is incident through interchangeable lens 200. The generated image data is digitized in AD converter 111. The digitized image data is subjected to predetermined image processing by camera controller 140. The predetermined image processing includes a gamma correction process, a white balance correction process, a blemish correction process, a YC conversion process, an electronic zoom process, and a JPEG compression process, for example.

CCD 110 operates with timing controlled by timing generator 112. The operations of CCD 110 includes but not limited to an imaging operation of a still image and an imaging operation of a through image. The through image, which is primarily a moving image, is displayed on liquid crystal monitor 120 for the user to compose the still image to be imaged.

Liquid crystal monitor 120 displays an image represented by display image data which has undergone the image processing in camera controller 140. Liquid crystal monitor 120 can selectively display the moving image and the still image.

Card slot 170 into which memory card 171 can be inserted controls memory card 171 based on control from camera controller 140. Digital camera 1 is able to store image data into memory card 171 or is able to read the image data out from memory card 171.

Power source 160 supplies power to the respective elements in digital camera 1.

Body mount 150 (an example of a second communication unit) can mechanically and electrically connect with lens mount 250 (an example of a first communication unit) of interchangeable lens 200. Camera body 100 and interchangeable lens 200 can transmit and receive data to and from each other via a connector installed in body mount 150 and in lens mount 250. Body mount 150 transmits the exposure synchronizing signal received from camera controller 140 to lens controller 240 via lens mount 250. Further, body mount 150 transmits the other control signals received from camera controller 140 to lens controller 240 via lens mount 250. Still further, body mount 150 transmits the signal received from lens controller 240 via lens mount 250 to camera controller 140. Still further, body mount 150 supplies power from power source 160 to the whole of interchangeable lens 200 via lens mount 250.

Also, camera body 100 further implements a configuration of realizing the BIS function of correcting a camera shake by having gyro sensor 184 (a shake detection unit) which detects a shake of camera body 100 and BIS processing unit 183 which generates the shake correction signal and controls a shake correction process based on a detection result from gyro sensor 184. Further, camera body 100 has CCD driving unit 181 which moves CCD 110, and position sensor 182 which detects a position of CCD 110. CCD driving unit 181 can be made with a magnet and a planar coil, for example. Position sensor 182 is a sensor which detects a position of CCD 110 in a plane perpendicular to an optical axis of an optical system. Position sensor 182 can be made with a magnet and a Hall element, for example. Based on a signal from gyro sensor 184 and a signal from position sensor 182, BIS processing unit 183 controls CCD driving unit 181 to shift CCD 110 in a plane perpendicular to the optical axis so that the shift offsets the shake of camera body 100. Although an imaging sensor provided in camera body 100 includes a CCD in the first exemplary embodiment, the imaging sensor may include a different imaging sensor such as a CMOS sensor. Also, CCD driving unit 181 may be configured with a different actuator such as a stepping motor or an ultrasonic motor. Incidentally, in a case where a stepping motor is used as the actuator, camera body 100 can implement open-loop control and, accordingly, can even dispose of position sensor 182.

1-2. Interchangeable Lens

Interchangeable lens 200 has the optical system, lens controller 240, and lens mount 250. The optical system includes zoom lens 210, OIS (Optical Image Stabilizer) lens 220 for correcting a camera shake, and focus lens 230.

Zoom lens 210 is for changing a magnification of an object image which is formed by the optical system. Zoom lens 210 includes one or more lenses. Zoom lens driving unit 211, which includes a user-operable part such as a zoom ring, transmits a user operation to zoom lens 210 to cause zoom lens 210 to move along an optical axis direction of the optical system.

Focus lens 230 is for changing a focus state of an object image which is formed on CCD 110 by the optical system. Focus lens 230 includes one or more lenses.

Focus lens driving unit 233, which includes a motor, moves focus lens 230 along the optical axis of the optical system based on the control of lens controller 240. Focus lens driving unit 233 can be made with, for example, a DC motor, a stepping motor, a servo motor, or an ultrasonic motor.

OIS lens 220 is a lens for correcting a blur in the object image formed by the optical system of interchangeable lens 200 in the OIS function of correcting a camera shake. OIS lens 220 decreases a blur in the object image on CCD 110 by moving in a direction that offsets a shake of digital camera 1. OIS lens 220 includes one or more lenses. OIS processing unit 223 controls OIS driving unit 221 based on an output from position sensor 222 and an output from gyro sensor 224 (a shake detector). In response to the control from OIS processing unit 223, OIS driving unit 221 shifts OIS lens 220 in a plane perpendicular to the optical axis of the optical system.

OIS driving unit 221 can be made with, for example, a magnet and a planar coil. Position sensor 222 is a sensor which detects a position of OIS lens 220 in the plane perpendicular to the optical axis of the optical system. Position sensor 222 can be made with a magnet and a Hall element, for example. In the first exemplary embodiment, OIS driving unit 221 may include a different actuator such as an ultrasonic motor.

Gyro sensor 184 or gyro sensor 224 detects a shake in the yaw direction and a shake in the pitch direction based on an angular change per unit time, i.e., an angular velocity of digital camera 1. Gyro sensor 184 or gyro sensor 224 outputs an angular velocity signal which indicates an amount of the detected shake (the detected angular velocity) to OIS processing unit 223 or BIS processing unit 183. The angular velocity signal output from gyro sensor 184 or gyro sensor 224 may contain a wide-band frequency component resulting from a camera shake, a mechanical noise, or the like. Although a gyro sensor is used as an angular velocity detection unit in the first exemplary embodiment, the other sensors can be used as far as the sensor is able to detect a shake of digital camera 1.

Camera controller 140 and lens controller 240 may include a hardwired electronic circuit or a microcomputer using a program. That is also the case with OIS processing unit 223 or BIS processing unit 183. For example, camera controller 140 and lens controller 240 as well as OIS processing unit 223 or BIS processing unit 183 may include semiconductor circuits such as a CPU, an MPU, a GPU, an ASIC, an FPGA, and the like.

1-3. OIS Processing Unit

Figure 2:
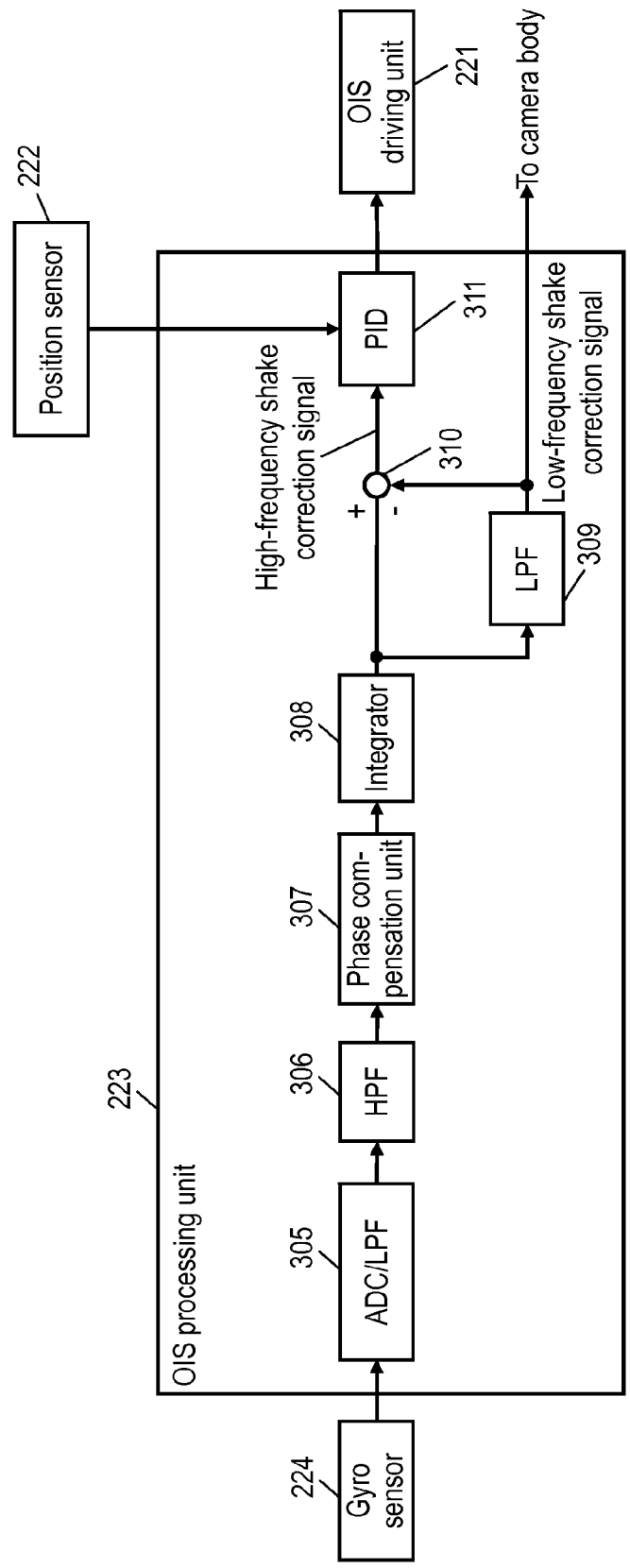
FIG. 2 is a block diagram illustrating a configuration of an OIS (Optical Image Stabilizer) processing unit of the digital camera according to the first exemplary embodiment.

A configuration of OIS processing unit 233 in interchangeable lens 200 will be described with reference to FIG. 2. OIS processing unit 233 includes ADC (analogue-to-digital converter)/LPF (low-pass filter) 305, HPF (high-pass filter) 306, phase compensation unit 307, integrator 308, LPF 309, adder 310, and PID (proportional-integral-derivative) control unit 311.

ADC/LPF 305 converts the angular velocity signal output from gyro sensor 224 from an analog form into a digital form. Further, ADC/LPF 305 cuts off a high-frequency component from the converted digital form of the angular velocity signal in order to remove a noise and extract only a shake of digital camera 1. A frequency of a shake transmitted from the user's hands is as low as 1 Hz to 10 Hz; therefore, in consideration of the fact, a cutoff frequency of the LPF is set. In a case where digital camera 1 has only a negligible noise, digital camera 1 can omit the LPF function.

HPF 306 cuts off a predetermined low-frequency component contained in a signal received from ADC/LPF 305 to cut off a drift component. Phase compensation unit 307 corrects a phase delay which results from causes including undermentioned OIS driving unit 221 and lens-to-camera body communication, described later, in a signal received from HPF 306.

Integrator 308 integrates a signal indicating an angular velocity of the shake (vibration), input from phase compensation unit 307 and generates a signal indicating an angle of the shake (vibration). Hereinafter, the signal generated by integrator 308 will be referred to as "shake correction signal."

The shake correction signal from integrator 308 is input to LPF 309 and adder 310. LPF 309 cuts off a high-frequency component of the shake correction signal and lets a low-frequency component, which will be referred to as "low-frequency shake correction signal" hereinafter, passed through. The low-frequency shake correction signal is a signal indicating an amount of shake correction corresponding to a shake in a low frequency domain. Meanwhile, the cutoff frequency of LPF 309 is set to, for example, 5 Hz in consideration of the frequency of the shake transmitted from the user's hands around 1 Hz to 10 Hz. Although the LPF is used for the generation of the low-frequency shake correction signal in the first exemplary embodiment, the LPF of any order such as a first-order LPF, a second-order LPF, or the LPF of higher order may be used without limitation. Further, any other filter may be used as far as the filter cuts a high-frequency component such as LSF (low shelf filter). Still further, the cutoff frequency is not limited to 5 Hz and may be changed depending on a transmitted shake, the imaging apparatus used, and imaging conditions. Still further, the filter configuration is not limited to the above described configuration and may be a different configuration such as a configuration in which the order of HPF 306 and integrator 308, for example, is reversed.

Adder 310 extracts the high-frequency component of the shake correction signal, which will be referred to as "high-frequency shake correction signal" hereinafter, by subtracting the low-frequency component of the shake correction signal, which has been extracted by LPF 309, from the shake correction signal input from integrator 308. The high-frequency shake correction signal is a signal indicating an amount of shake correction corresponding to a shake in a high frequency domain. The high-frequency shake correction signal is input to PID control unit 311. On the other hand, the low-frequency shake correction signal is transmitted to camera body 100.

PID control unit 311 performs PID control based on a difference between the input high-frequency shake correction signal and current positional information of OIS lens 220 received from position sensor 222 to generate a driving signal for OIS driving unit 221 and transmits the driving signal to OIS driving unit 221. OIS driving unit 221 drives OIS lens 220 based on the driving signal.

1-4. BIS Processing Unit

Figure 3:
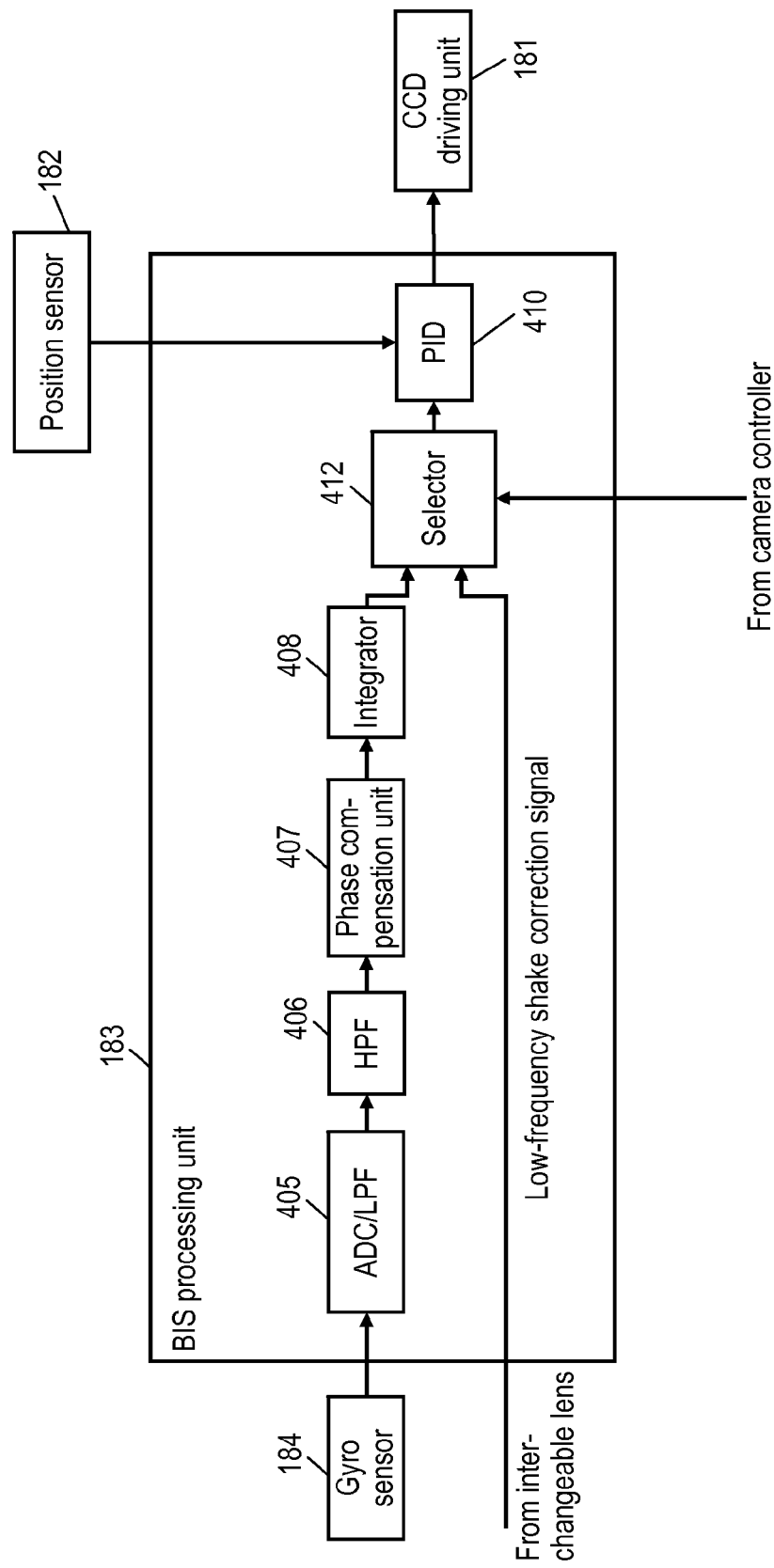
FIG. 3 is a block diagram illustrating a configuration of a BIS (Body Image Stabilizer) processing unit of the digital camera according to the first exemplary embodiment.

A configuration of BIS processing unit 183 in camera body 100 will be described with reference to FIG. 3. BIS processing unit 183 includes ADC (analogue-to-digital converter)/LPF (low-pass filter) 405, HPF (high-pass filter) 406, phase compensation unit 407, integrator 408, selector 412, and PID (proportional-integral-derivative) control unit 410.

Basic functions of ADC/LPF 405, HPF 406, phase compensation unit 407, integrator 408, and PID control unit 410 are the same as the functions of corresponding elements in OIS processing unit 223.

BIS processing unit 183 is configured to perform the shake correction process particularly based on one of the output from gyro sensor 184 provided in camera body 100 (an output from integrator 408) and the low-frequency shake correction signal received from interchangeable lens 200. Therefore, BIS processing unit 183 has selector 412 which is configured to select one of the output from gyro sensor 184 provided in camera body 100 (an output from integrator 408) and the low-frequency shake correction signal received from interchangeable lens 200 and output the selected one to PID control unit 410. In a case where camera body 100 implements a shake correction function by itself to meet such circumstances of an interchangeable lens that does not have a shake correction function, selector 412 selects the output from gyro sensor 184 provided in camera body 100 (an output from integrator 408) for the output to PID control unit 410. Selector 412 is controlled by camera controller 140.

PID control unit 410 generates a driving signal for shifting CCD 110 based on an output from position sensor 182 and the output from integrator 408 or the output from the low-frequency shake correction signal from interchangeable lens 200 and outputs the driving signal to CCD driving unit 181. CCD driving unit 181 shifts the position of CCD 110 based on the driving signal.

2. Shake Correction Process

The shake correction process in digital camera 1 of the above described configuration will be described. In the description below, the shake correction process will be described by taking an example of a case where digital camera 1 drives OIS lens 220 and CCD 110 based on the signal from gyro sensor 224 provided in interchangeable lens 200 among the two gyro sensors 224 and 184. That is, digital camera 1 uses gyro sensor 224 provided in interchangeable lens 200. On that occasion, selector 412 in BIS processing unit 183 is controlled to select the low-frequency shake correction signal and output the low-frequency shake correction signal to PID control unit 410. Further on that occasion, digital camera 1 operates by using interchangeable lens 200 which has gyro sensor 224 to be used as a master and by using camera body 100 as a slave.

OIS processing unit 223 receives a detection signal from gyro sensor 224 and generates the shake correction signal from the received detection signal. Then, OIS processing unit 223 separates the high-frequency shake correction signal and the low-frequency shake correction signal from the shake correction signal. OIS processing unit 223 generates the driving signal for shifting OIS lens 220 based on the high-frequency shake correction signal and the positional information from position sensor 222 and transmits the driving signal to OIS driving unit 221. According to the driving signal from OIS processing unit 223, OIS driving unit 221 causes OIS lens 220 to shift in the plane perpendicular to the optical axis to cancel the high-frequency shake among the shake detected by gyro sensor 224.

The low-frequency shake correction signal generated in OIS processing unit 223 is transmitted to camera body 100 by lens-to-camera body communication over lens mount 250 and body mount 150. On that occasion, in BIS processing unit 183 of camera body 100, selector 412 is controlled to select the low-frequency shake correction signal from interchangeable lens 200. BIS processing unit 183 generates the driving signal for shifting CCD 110 based on the low-frequency shake correction signal from interchangeable lens 200 and the positional information from position sensor 182 and outputs the driving signal to CCD driving unit 181. According to the driving signal from BIS processing unit 183, CCD driving unit 181 causes CCD 110 to shift in the plane perpendicular to the optical axis to cancel the low-frequency shake detected by gyro sensor 224. Incidentally, although digital camera 1 performs the lens-to-camera body communication over lens mount 250 and body mount 150 in the first exemplary embodiment, it may perform the communication by using optical communications or radio communications.

As described above, digital camera 1 according to the first exemplary embodiment activates the shake correction function provided at interchangeable lens 200 based on the high-frequency component in the detected shake correction signal and activates the shake correction function provided at camera body 100 based on the low-frequency component in the detected shake correction signal. Thus, in the first exemplary embodiment, digital camera 1 shares the shake correction function between camera body 100 and interchangeable lens 200 so that it only needs to exclusively correct a high-frequency shake at interchangeable lens 200. As a result, digital camera 1 is able to effectively use a correction range of OIS lens 220 at interchangeable lens 200.

Since the low-frequency shake correction signal is transmitted from interchangeable lens 200 to camera body 100 in the first exemplary embodiment, the phase of the low-frequency shake correction signal received at camera body 100 is delayed due to the influence of a cycle of the lens-to-camera body communication. OIS processing unit 223 is able to prevent correction performance deterioration also by advancing the phase of the high-frequency shake correction signal in consideration of the phase delay of the low-frequency shake correction signal. In this case, digital camera 1 calculates an amount of phase of the high-frequency shake correction signal to be advanced based on the cycle of the lens-to-camera body communication. Digital camera 1 according to the first exemplary embodiment uses the low-frequency shake correction signal for the shake correction signal to be transmitted from the master. With that configuration, digital camera 1 is able to reduce the influence of the phase delay of the signal due to the lens-to-camera body communication.

Figure 4:
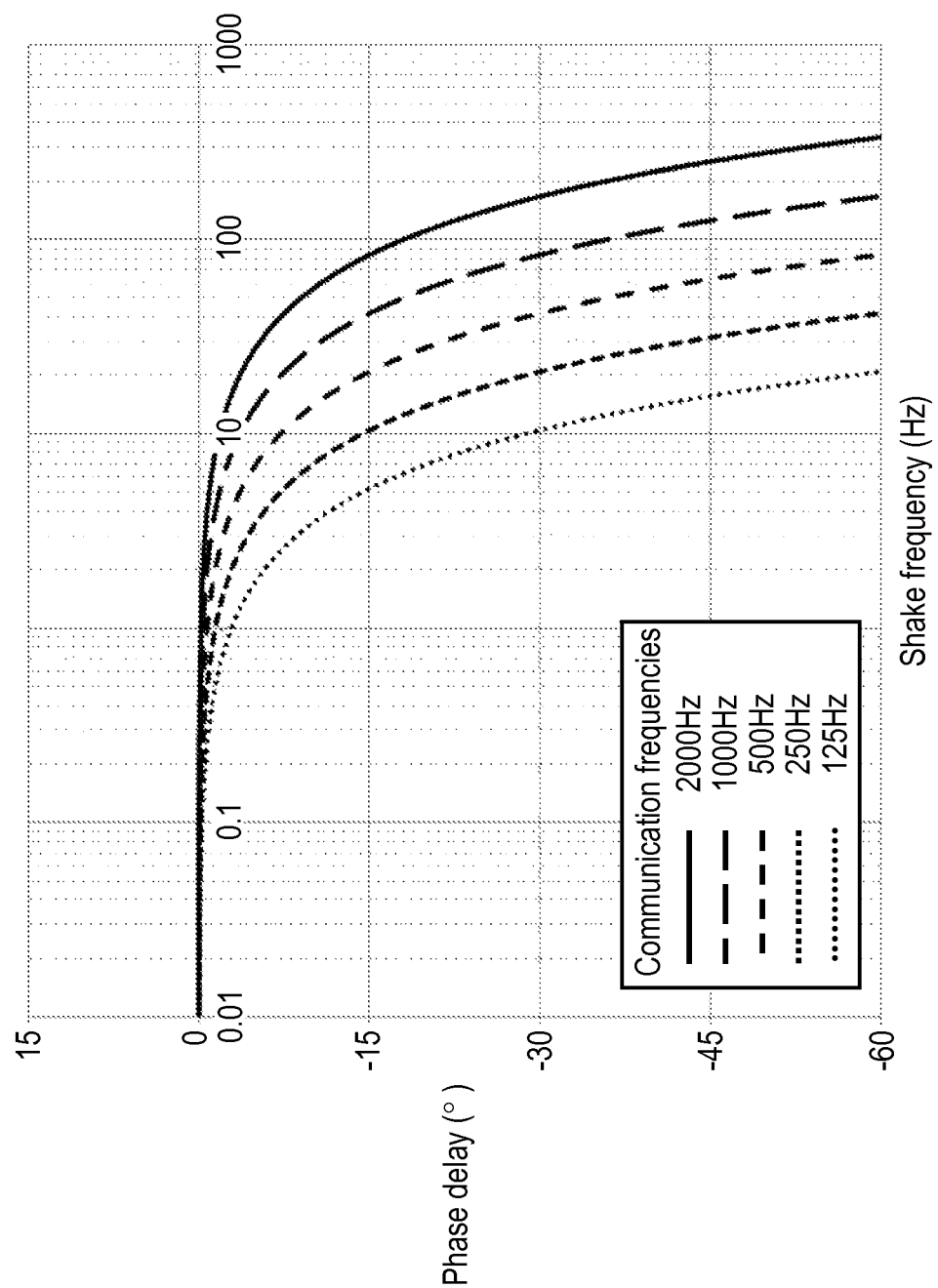
FIG. 4 is a frequency characteristics graph of phase delay versus several different communication frequencies.
Figure 5:
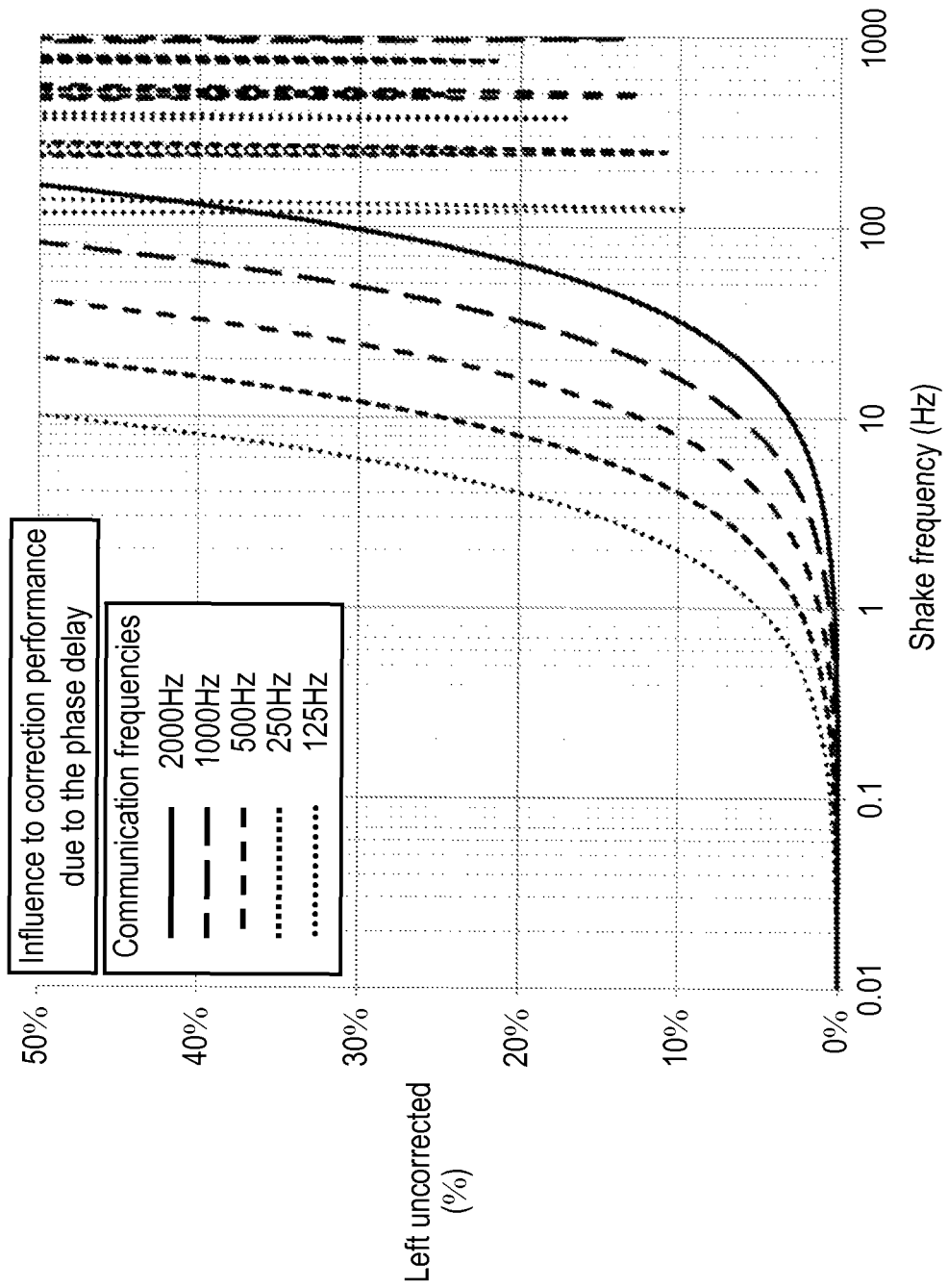
FIG. 5 is a frequency characteristics graph of correction performance deterioration versus several different communication frequencies.

FIG. 4 is a frequency characteristics graph of phase delay calculated for several different communication frequencies between interchangeable lens 200 and camera body 100. In FIG. 4, a horizontal axis represents a frequency of the shake correction signal (shake frequency) transmitted between interchangeable lens 200 and camera body 100 and a vertical axis represents the phase delay. It is apparent from FIG. 4 that the lower the communication frequency is, the longer the phase delay becomes for the same shake frequency. FIG. 5 is a frequency characteristics graph of correction performance deterioration calculated for several different communication frequencies. In FIG. 5, the horizontal axis represents the shake frequency and the vertical axis represents a proportion (percentage) of the shake which is caused by the phase delay and cannot be corrected by digital camera 1. It is apparent from FIG. 4 that the lower the communication frequency, the more the shake which is left uncorrected due to the phase delay, thus, the more the shake yet to be corrected. Further, the higher the shake frequency is, the more significant the correction performance deterioration is.

In consideration of those facts, the communication frequency between interchangeable lens 200 and camera body 100 for the transmission of the low-frequency shake correction signal is set to 250 Hz or higher in the first exemplary embodiment.

Figure 6:
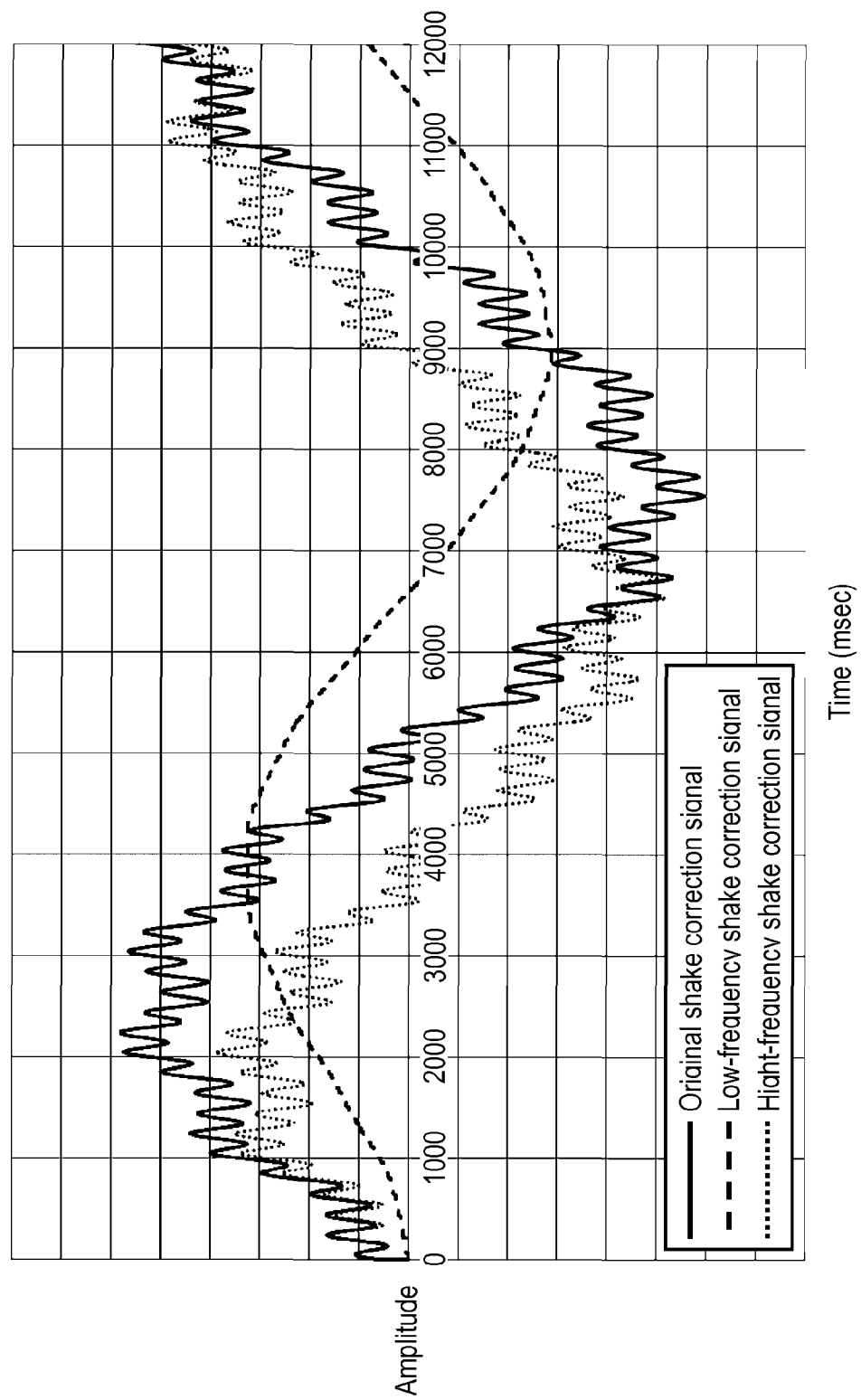
FIG. 6 is a graph showing time variations for a shake detection signal, a low-frequency shake correction signal (BIS control signal), and a high-frequency shake correction signal (OIS control signal) in a shake correction process according to the first exemplary embodiment.

FIG. 6 is a graph showing respective variations for an original shake correction signal which is the shake correction signal (correction signal before separated into the high-frequency component and the low-frequency component), the low-frequency shake correction signal, and the high-frequency shake correction signal in the shake correction process according to the first exemplary embodiment. Digital camera 1 calculates the low-frequency shake correction signal by passing the original shake correction signal through the LPF. Digital camera 1 calculates the high-frequency shake correction signal by subtracting the low-frequency shake correction signal from the original shake correction signal. As shown in FIG. 6, the phase of the low-frequency shake correction signal which is denoted by a bold dashed line is delayed from the phase of the original shake correction signal which is denoted by a thin dashed line. Digital camera 1 advances the high-frequency shake correction signal which is denoted by a thin dashed line by subtracting the low-frequency shake correction signal which has the delayed phase from the original shake correction signal.

Although interchangeable lens 200 is used as the master in the first exemplary embodiment, camera body 100 may be used as the master. That is, digital camera 1 may control the OIS function and the BIS function based on the output from gyro sensor 184 of camera body 100. For this case, BIS processing unit 183 is preferably configured to separate the low-frequency shake correction signal and the high-frequency shake correction signal from the shake correction signal calculated on the basis of the detection signal from gyro sensor 184 as illustrated in FIG. 3. The low-frequency shake correction signal is transmitted from camera body 100 to interchangeable lens 200, in which driving of OIS lens 220 is controlled based on the low-frequency shake correction signal. On the other hand, in camera body 100, driving of CCD 110 is controlled based on the high-frequency shake correction signal. In this case, digital camera 1 is able to effectively use a correction range of BIS at camera body 100.

That is, digital camera 1 only needs to control the shake correction function of one of interchangeable lens 200 and camera body 100 that is used as the master based on the high-frequency shake correction signal and to control the shake correction function of the other of interchangeable lens 200 and camera body 100 based on the low-frequency shake correction signal.

In this case, the selection of the master from camera body 100 and interchangeable lens 200 is preferably based on accuracy of the shake correction by the OIS function and by the BIS function. Since digital camera 1 according to the first exemplary embodiment has the OIS function able to perform the shake correction with higher accuracy than the BIS function is, digital camera 1 selects interchangeable lens 200 for the master. With that configuration, digital camera 1 is able to efficiently use the two shake correction functions. As shown in FIG. 6, the high-frequency component of the shake correction signal represents vibrations of shorter cycles as compared to the low-frequency component. Therefore, the high-frequency component of the shake correction signal requires the shake correction of higher accuracy as compared to the low-frequency component. Then, digital camera 1 according to the first exemplary embodiment corrects the high-frequency component of the shake correction signal by using the OIS function which is able to correct the shake with high accuracy but corrects the low-frequency component of the shake correction signal by using the BIS function which corrects the shake with accuracy not as high as that of the OIS function. For that purpose, digital camera 1 is configured to cause the master to actively transmit the low-frequency component of the shake correction signal to the slave.

Digital camera 1 may perform the shake correction based on the high-frequency shake correction signal and the low-frequency shake correction signal continuously or exclusively during an exposure. For example, OIS processing unit 223 performs the shake correction process based on the signal from gyro sensor 224 provided in interchangeable lens 200 before pushing of release button 130 which is configured to receive a photographing instruction from the user. Meanwhile, BIS processing unit 183 executes a stop operation at a center position. Then, in response to the pushing of release button 130, CCD driving unit 181 starts the shake correction process based on the low-frequency shake correction signal received from interchangeable lens 200 and continues performing the shake correction process until the end of the exposure. After the exposure is finished, BIS processing unit 183 executes the stop operation at a center position again. Meanwhile, during a predetermined period after the release button 130 receives the photographing instruction from the user (a period as long as or longer than an exposure period), the low-frequency shake correction signal is transmitted from interchangeable lens 200 to camera body 100 via lens mount 250 and body mount 150. With that configuration, digital camera 1 corrects the shake in response only to the high-frequency shake correction signal by the OIS function before the pushing of release button 130. Further, digital camera 1 corrects the shake both in response to the high-frequency shake correction signal by the OIS function and in response to the low-frequency shake correction signal by the BIS function after the pushing of release button 130. Accordingly, before the exposure, digital camera 1 is able to perform the image blur correction with restrained power consumption, and during the exposure, digital camera 1 is able to perform the image blur correction with effective image blur correction.

3. Summarization

Digital camera 1 according to the first exemplary embodiment has interchangeable lens 200 and camera body 100 with one of interchangeable lens 200 and camera body 100 acting as the master and the other acting as the slave. Interchangeable lens 200 includes OIS lens 220 configured to correct an image blur and OIS driving unit 221 configured to perform image blur correction by moving OIS lens 220 in a plane perpendicular to the optical axis. Camera body 100 includes CCD 110 configured to generate image data by imaging an object image which is formed by interchangeable lens 200 and CCD driving unit 181 configured to perform image blur correction by moving CCD 110 in a plane perpendicular to the optical axis. Digital camera 1 according to the first exemplary embodiment has, at one of interchangeable lens 200 and camera body 100, which acts as the master, gyro sensor 224 or gyro sensor 184 configured to detect a shake of camera body 100 or interchangeable lens 200 or both of camera body 100 and interchangeable lens 200 and shake correction processing unit (OIS processing unit 223, BIS processing unit 183) configured to calculate an amount of shake correction for OIS lens 220 and CCD 110 from an output from gyro sensor 224 or gyro sensor 184.

The shake correction processing unit (OIS processing unit 223, BIS processing unit 183) calculates an amount of image blur correction for the image blur occurred in digital camera 1 and separates the shake correction signal which indicates an amount of shake occurred in digital camera 1 into the shake correction signal (the low-frequency shake correction signal) corresponding to a shake in the low frequency domain, and the shake correction signal (the high-frequency shake correction signal) corresponding to a shake in the high frequency domain. One of OIS driving unit 221 and CCD driving unit 181 functions as a driving unit in the master and performs the image blur correction based on the shake correction signal of the high frequency domain. The other of OIS driving unit 221 and CCD driving unit 181 performs the image blur correction based on the shake correction signal of the low frequency domain.

With that configuration, digital camera 1 can share the shake correction function between camera body 100 and interchangeable lens 200 so that it only needs to exclusively correct the high-frequency shake at interchangeable lens 200. As a result, digital camera 1 is able to effectively use a correction range of OIS lens 220 at interchangeable lens 200.

Second Exemplary Embodiment

Another exemplary configuration of the digital camera that implements the shake correction will be described below. The configuration of the digital camera according to the second exemplary embodiment is the same as that of the first exemplary embodiment except for the OIS processing unit and BIS processing unit.

Figure 7:
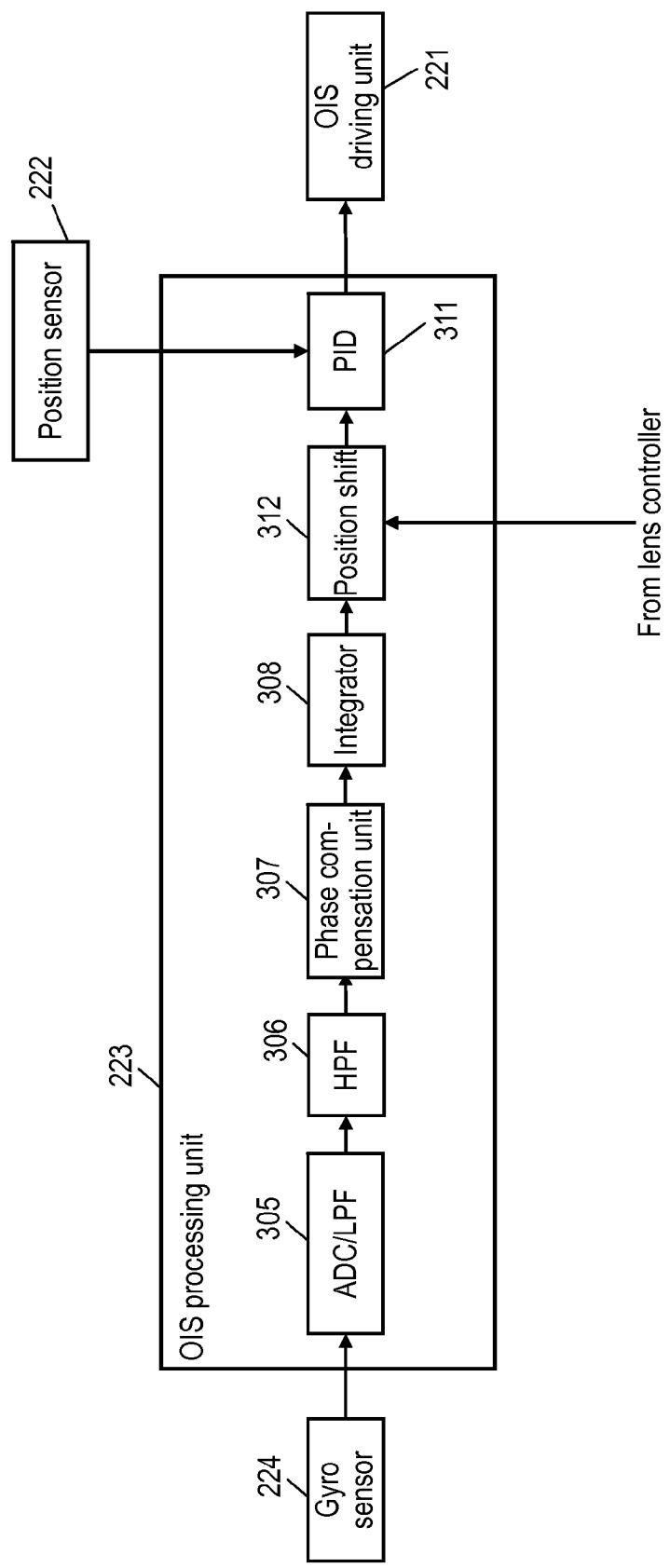
FIG. 7 is a block diagram illustrating a configuration of an OIS processing unit of a digital camera according to a second exemplary embodiment.

FIG. 7 is a block diagram illustrating a configuration of OIS processing unit 223 of digital camera 1 according to the second exemplary embodiment. OIS processing unit 223 according to the second exemplary embodiment includes ADC/LPF 305, HPF 306, phase compensation unit 307, integrator 308, and PID control unit 311. Functions of these structural elements are the same as those described in the first exemplary embodiment. OIS processing unit 223 according to the second exemplary embodiment further includes position shift unit 312 configured to shift a center position of movement of OIS lens 220 according to an instruction from lens controller 240. Specifically, position shift unit 312 causes the center position of the movement of OIS lens 220 to be reflected in an output, i.e., the shake correction signal, from integrator 308. Hereinafter, the signal output from position shift unit 312 will be referred to as "OIS control signal."

Figure 8:
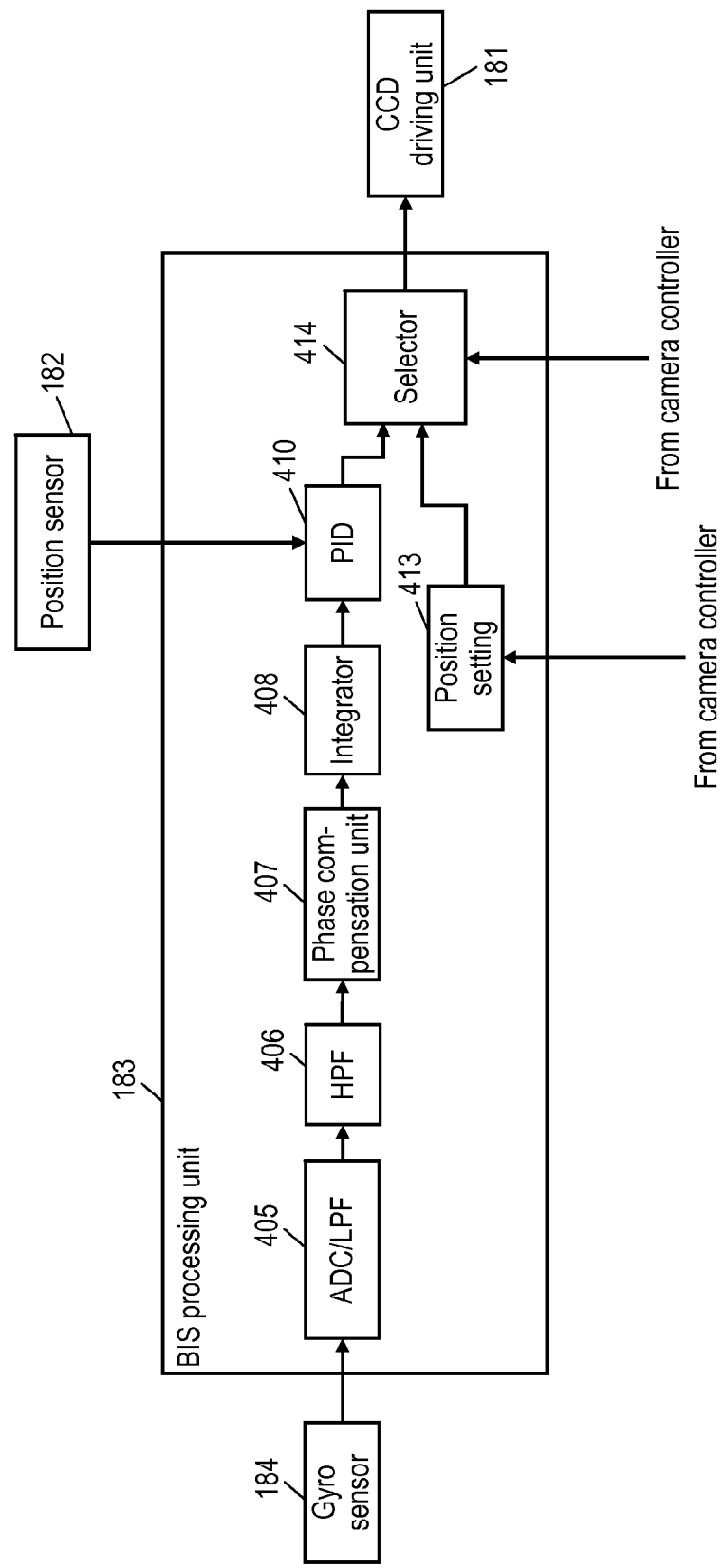
FIG. 8 is a block diagram illustrating a configuration of a BIS processing unit of the digital camera according to the second exemplary embodiment.

FIG. 8 is a block diagram illustrating a configuration of BIS processing unit 183 of digital camera 1 according to the second exemplary embodiment. BIS processing unit 183 according to the second exemplary embodiment includes ADC/LPF 405, HPF 406, phase compensation unit 407, integrator 408, and PID control unit 410. Functions of these structural elements are the same as those described in the first exemplary embodiment. BIS processing unit 183 according to the second exemplary embodiment further includes position setting unit 413 and selector 414. Position setting unit 413 outputs a signal for setting a position of CCD 110. Selector 414 selects one of the output from PID control unit 410 and the output from position setting unit 413 and outputs the selected one to CCD driving unit 181. Position setting unit 413 and selector 414 are controlled by camera controller 140. Hereinafter, the output from position setting unit 413 will be referred to as "BIS control signal."

In the second exemplary embodiment, digital camera 1 uses only the OIS function in interchangeable lens 200 to perform the shake correction. For that purpose, selector 414 of BIS processing unit 183 is configured to select the output from position setting unit 413. In a case where camera body 100 implements the shake correction function by itself to meet such circumstances of an interchangeable lens that does not have a shake correction function, selector 414 selects the output from PID control unit 410.

In a shake correction process according to the second exemplary embodiment, digital camera 1 centers OIS lens 220 particularly at the beginning of the exposure period to perform the shake correction during the exposure period. That is, digital camera 1 shifts the position of OIS lens 220 that has not been moved for the shake correction to a center position of a movable range of OIS lens 220. By centering OIS lens 220 as described above, digital camera 1 is able to effectively use the correction range during the exposure period available for OIS lens 220.

Figure 9:
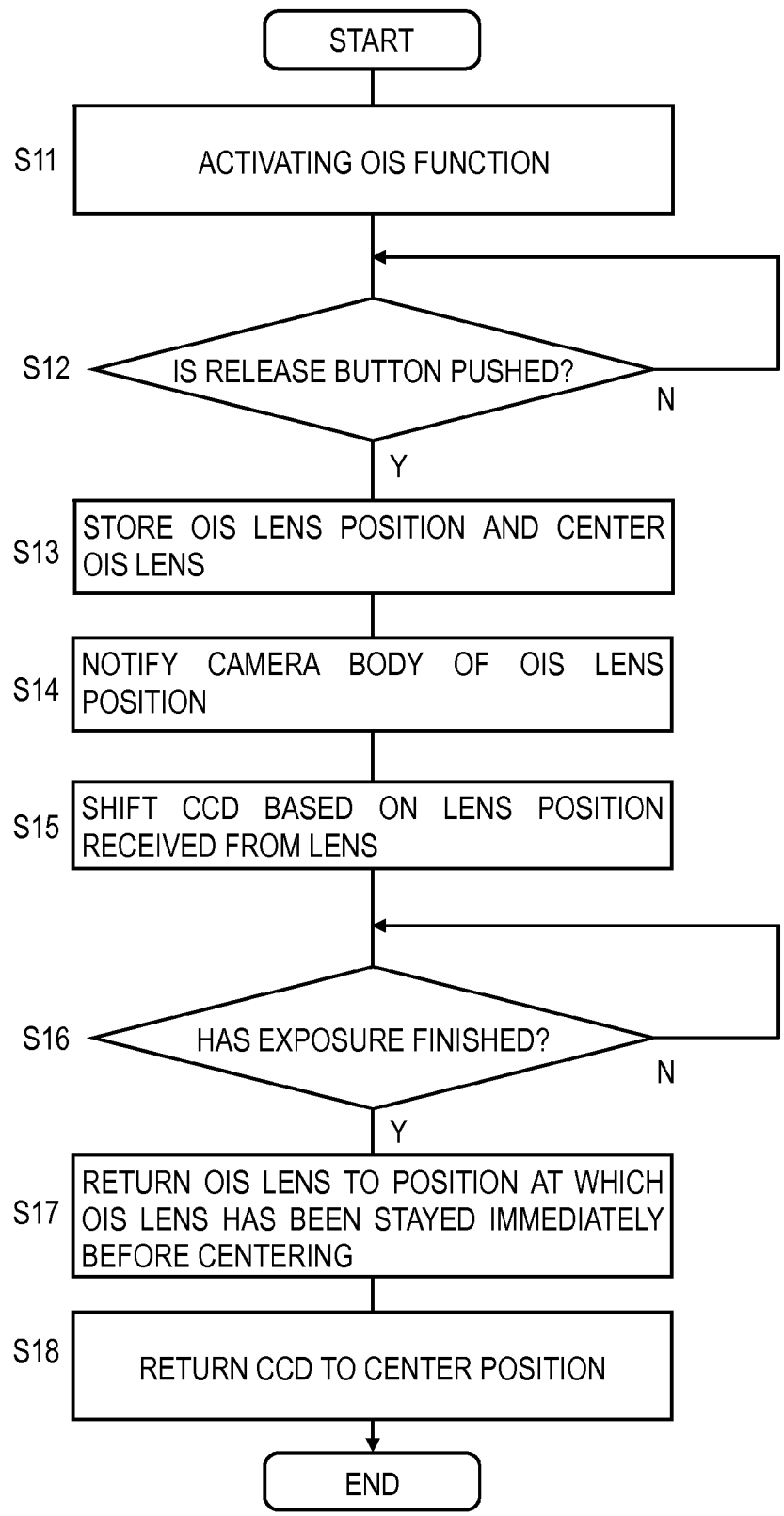
FIG. 9 is a flow chart showing steps of a shake correction process in the digital camera according to the second exemplary embodiment.

FIG. 9 is a flow chart showing steps of the shake correction process in digital camera 1 according to the second exemplary embodiment. As described above when digital camera 1 is not in the exposure period (in a live view display state), it activates only the OIS function (S11). In response to pushing of release button 130 by the user (YES in S12), camera controller 140 transmits a release signal which indicates the depression of release button 130 to lens controller 240 via body mount 150 and lens mount 250. In response to reception of the release signal, lens controller 240 stores information indicating a current position of OIS lens 220 in DRAM 241 and controls OIS processing unit 223 to center the position of OIS lens 220 (to move to the center position) (S13). On that occasion, the OIS control signal for shifting the center position of the movement of OIS lens 220 is generated by position shift unit 312. Further, lens controller 240 transmits the positional information of OIS lens 220 stored in DRAM 241 to camera body 100 via lens mount 250 and body mount 150 (S14). Incidentally, lens controller 240 may transmit the positional information of OIS lens 220 by using the ordinary lens-to-camera body communication or by adding the positional information to the low-frequency shake correction signal transmitted from interchangeable lens 200.

In response to reception of the positional information of OIS lens 220 from interchangeable lens 200, camera controller 140 of camera body 100 converts the received positional information (the position of OIS lens 220 immediately before the centering) into an amount of movement of CCD 110 and calculates a target position for the movement of CCD 110. Camera controller 140 controls BIS processing unit 183 to move CCD 110 to the target position for the movement (S15). On that occasion, the BIS control signal for moving CCD 110 to the target position for the movement is generated by position setting unit 413. During the exposure after S15, BIS processing unit 183 keeps CCD 110 at the targeted position (S16).

In response to the end of exposure, camera controller 140 notifies lens controller 240 of the end of exposure. Lens controller 240 reads out the positional information from DRAM 241 and controls OIS processing unit 223 to move OIS lens 220 to the position indicated by the positional information (S17). On that occasion, the BIS control signal for moving CCD 110 to the position indicated by the positional information is generated by position setting unit 413. Further, BIS processing unit 183 returns CCD 110 to a predetermined center position for CCD 110 (S18). On that occasion, the BIS control signal for moving CCD 110 to the predetermined center position is generated by position setting unit 413.

Figure 10:
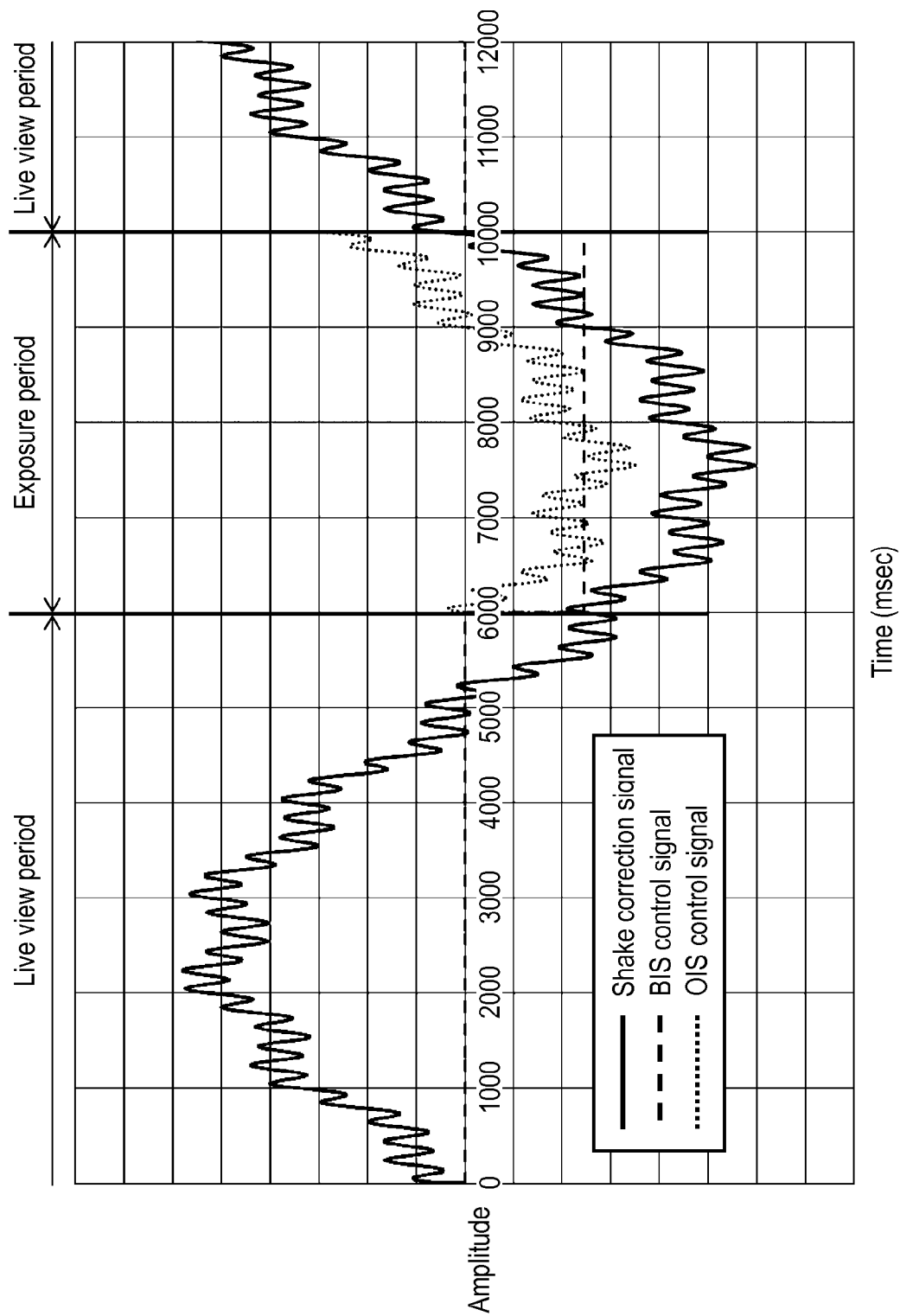
FIG. 10 is a graph showing changes in a shake detection signal, a BIS control signal, and an OIS control signal in a shake correction process according to the second exemplary embodiment.

FIG. 10 is a graph showing changes in the shake detection signal (the output from integrator 308), the BIS control signal (the output from position shift unit 312), and the OIS control signal (the output from position setting unit 413) in the above described shake correction process. As shown in FIG. 10, OIS lens 220 is controlled to be shifted to the center position and to be driven around the center position. On the other hand, CCD 110 is shifted and fixed to a position corresponding to the position of OIS lens 220 at which OIS lens 220 has been stayed immediately before the centering. During the period other than the exposure period, OIS lens 220 is controlled to be driven around an original center position and CCD 110 is also fixed to an original center position.

As described above, at the beginning of the exposure period, digital camera 1 according to the second exemplary embodiment centers OIS lens 220 and shifts CCD 110 by an amount corresponding to the amount of movement for centering OIS lens 220. Then, digital camera 1 executes the OIS function with CCD 110 fixed to the position. In response to the end of exposure, digital camera 1 returns OIS lens 220 to the position at which OIS lens 220 has been stayed immediately before the centering and also returns CCD 110 to the predetermined center position.

By centering OIS lens 220 at the beginning of the exposure, digital camera 1 is able to effectively use the correction range during the exposure available for OIS lens 220. Further, by moving CCD 110 to offset the amount of the centering of OIS lens 220, digital camera 1 is able to prevent the centering from causing a deviation of an angle of view. As a result, digital camera 1 is able to allow the user to capture an image from the same angle of view as that the user has checked before the exposure and is also able to effectively use the image blur correction.

Figure 11:
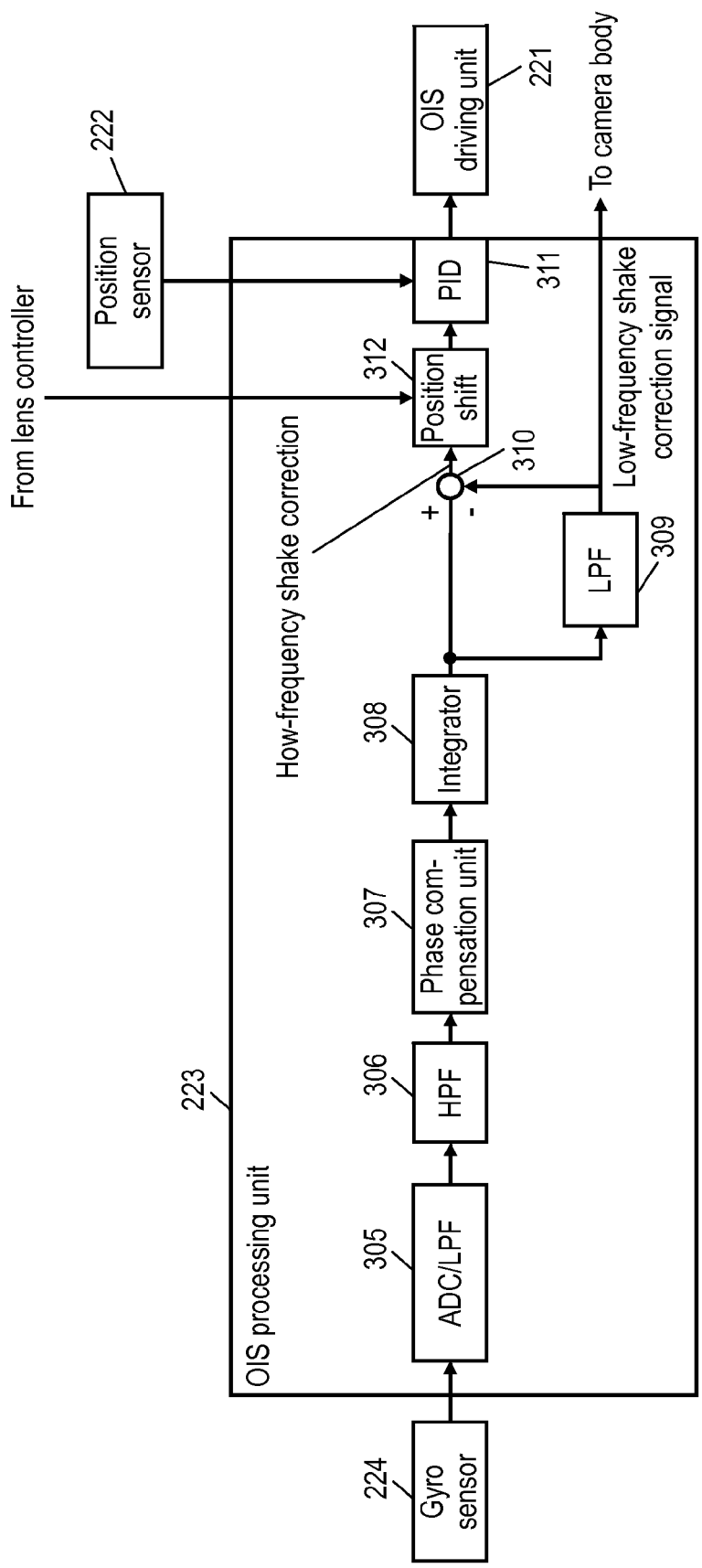
FIG. 11 is a block diagram illustrating another configuration of the OIS processing unit of the digital camera according to the second exemplary embodiment.
Figure 12:
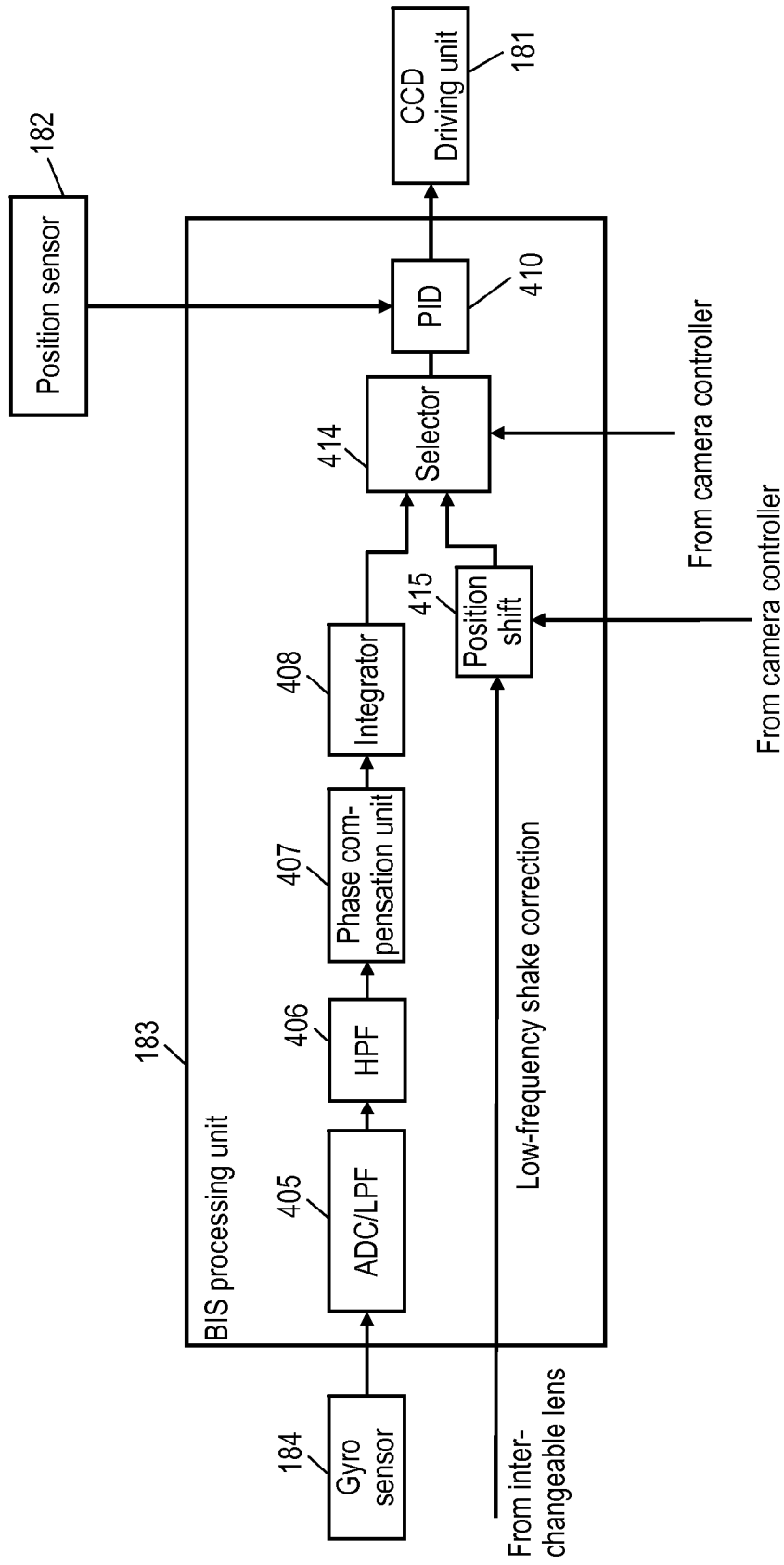
FIG. 12 is a block diagram illustrating another configuration of the BIS processing unit of the digital camera according to the second exemplary embodiment.

Also in the second exemplary embodiment, OIS processing unit 223 may be configured to generate the high-frequency shake correction signal and drive OIS lens 220 based on the high-frequency shake correction signal. With that configuration, during the exposure period, digital camera 1 only needs to shift CCD 110 to the position corresponding to the amount of the centering of OIS lens 220 and does not need to drive CCD 110 based on the low-frequency shake correction signal. Still further, digital camera 1 may be configured to drive CCD 110 during the exposure period based on the low-frequency shake correction signal around the position to which CCD 110 has been shifted correspondingly to the amount of the centering of OIS lens 220. FIG. 11 and FIG. 12 show a configuration of OIS processing unit 223 and a configuration of BIS processing unit 183 for centering OIS lens 220 and also driving OIS lens 220 based on the high-frequency shake correction signal and driving CCD 110 based on the low-frequency shake correction signal during the exposure period.

As illustrated in FIG. 11, OIS processing unit 223 further includes LPF 309 and adder 310 for separating the shake correction signal into the high-frequency shake correction signal and the low-frequency shake correction signal as well as the configuration illustrated in FIG. 7. On the other hand, as illustrated in FIG. 12, BIS processing unit 183 includes position shift unit 415 in place of position setting unit 413 of the configuration illustrated in FIG. 8 and has selector 414 arranged at the position different from that of FIG. 8. Operations of the structural elements illustrated in FIG. 11 and FIG. 12 are basically the same as those described above. Incidentally, in a case where digital camera 1 is to perform the shake correction by separating the shake correction signal into the high-frequency shake correction signal and the low-frequency shake correction signal, selector 414 in BIS processing unit 183 selects the output from position shift unit 415.

In OIS processing unit 223, the shake correction signal from integrator 308 is separated into the high-frequency shake correction signal and the low-frequency shake correction signal by LPF 309 and adder 310. In the high-frequency shake correction signal, the center position of the movement of OIS lens 220 is shifted by position shift unit 312 during the exposure period. PID control unit 311 performs the PID control based on the high-frequency shake correction signal with the center position shifted and the current positional information of OIS lens 220 received from position sensor 222 to generate and output a driving signal for OIS driving unit 221.

On the other hand, in BIS processing unit 183, the output from position shift unit 415 is selected by selector 414. As described above, camera controller 140 receives the positional information of OIS lens 220 from interchangeable lens 200 and calculates an amount of shift for CCD 110 based on the received positional information (the position of OIS lens 220 at which OIS lens 220 has been stayed immediately before the centering).

During the period other than the exposure period, position shift unit 415 generates a signal for controlling CCD 110 to move to a predetermined home position. On the other hand, during the exposure period, position shift unit 415 shifts the center position of CCD 110 by the calculated amount of shift in the low-frequency shake correction signal. As a result, digital camera 1 drives CCD 110 during the exposure period to execute the shake correction based on the low-frequency shake correction signal around the position to which CCD 110 has been shifted correspondingly to the amount of the centering of OIS lens 220.

In the above described manner, digital camera 1 is able to implement the shake correction during the exposure period by centering OIS lens 220 and also by driving OIS lens 220 based on the high-frequency shake correction signal and driving CCD 110 based on the low-frequency shake correction signal.

Incidentally, in the second exemplary embodiment, digital camera 1 activates only the OIS function as the shake correction function. However, digital camera 1 may be configured to activate only the BIS function as the shake correction function. With that configuration, digital camera 1 only needs to center CCD 110 at the beginning of the exposure period. Further, digital camera 1 only needs to shift OIS lens 220 by the amount of movement of OIS lens 220 converted from the position of CCD 110 at which CCD 110 has been stayed immediately before the centering and to fix OIS lens 220 during the exposure period to the position. By driving CCD 110 around the position on which CCD 110 has been centered as described above during the exposure period, digital camera 1 is able to fully use the correction range available for CCD 110 (an available driving range) of CCD 110. Further, by shifting OIS lens 220 during the exposure period, digital camera 1 is also able to prevent a deviation of the angle of view.

In this case, the selection of the function to be activated as the shake correction function is preferably based on accuracy of the shake correction by the OIS function and by the BIS function and follow-up characteristics. Since digital camera 1 according to the second exemplary embodiment has the OIS function able to perform the shake correction with higher accuracy than the BIS function is, digital camera 1 selects the OIS function as the shake correction function. With that configuration, digital camera 1 is able to efficiently use the two shake correction functions.

3. Other Exemplary Embodiments

The spirit of the above described exemplary embodiments is not limited to the exemplary embodiments described above. Various exemplary embodiments may also be considered. Other exemplary embodiments to which the spirit of the above described exemplary embodiments can be applied will be described below.

The gyro sensor as the shake detection unit is not limited to a sensor configured to output an analogue signal and may be a sensor configured to output a digital signal. In the latter case, gyro sensor 224 and OIS processing unit 223 transmit data to each other by serial communications or the like.

Although the digital camera according to the first exemplary embodiment is configured to have the OIS function which is able to correct the shake with higher accuracy than the BIS function is and to correct the high-frequency component of the shake correction signal by using the OIS function, the present disclosure is not limited to that configuration. In a case where the digital camera has the BIS function which is able to correct the shake with higher accuracy than the OIS function is, the digital camera may correct the high-frequency component of the shake correction signal by using the BIS function and correct the low-frequency component of the shake correction signal by using the OIS function. In this case, the gyro sensor and the BIS processing unit provided in the camera body preferably function as the components in the master.

Although the digital camera according to the second exemplary embodiment is configured to have the OIS function which is able to correct the shake with higher accuracy than the BIS function is and to perform the shake correction during the exposure by using the OIS function, the present disclosure is not limited to that configuration. In a case where the digital camera has the BIS function which is able to correct the shake with higher accuracy than the OIS function is, the digital camera may perform the shake correction during the exposure by using the BIS function. In this case, the digital camera preferably uses the gyro sensor and the BIS processing unit provided in the camera body in performing processes including the calculation of the amount of shake.

Although the digital cameras according to the first and second exemplary embodiments are configured to have the OIS function which is able to correct the shake with higher accuracy than the BIS function is, the present disclosure is not limited to those configurations. The digital camera may be configured to cause the interchangeable lens to keep accuracy information of the OIS function and to cause the camera body to keep accuracy information of the BIS function so that the digital camera can select one of the OIS function and the BIS function to give priority as the shake correction function based on these pieces of accuracy information. That is, the digital camera may be configured to cause the accuracy information kept in the interchangeable lens and the accuracy information kept in the camera body to be transmitted to the camera controller or the lens controller by the lens-to-camera body communication when the interchangeable lens is mounted to the camera body so that the digital camera can select one of the OIS function and the BIS function to give priority as the shake correction function by comparing these pieces of accuracy information.

Although the digital cameras according to the first and second exemplary embodiments are configured to use the shake correction accuracy as the criterion for selecting one of the interchangeable lens and the camera body as the master, the present disclosure is not limited to those configurations. The digital camera may be configured to select one of the interchangeable lens and the camera body as the master based on detection accuracy, drift performance, noise performance, shutter shock resistance or mirror shock resistance of the gyro sensor, and so on. Alternatively, the digital camera may be configured to make the selection based on a combination of the shake correction accuracy, performances of the gyro sensor, and so on.

The exemplary embodiments have been described above as examples of the technology of the present disclosure. For describing those exemplary embodiments, the detailed description and the accompanying drawings have been disclosed. Consequently, the structural elements described in the detailed description and shown in the accompanying drawings may include a structural element that is not necessary to solve the problem. Therefore, the unnecessary structural element should not be instantly recognized as a necessary structural element merely because it is described in the detailed description and shown in the accompanying drawing.

The above described exemplary embodiments are for exemplifying the technology of the present disclosure. Therefore, the exemplary embodiments may be subjected to various changes, substitutions, addition and/or omission or the like without departing from the scope of the claims and the equivalent of the claims.

The spirit of the present disclosure can be applied to electronic devices provided with a shake correction function such as an imaging apparatus like a digital camera and a camcorder, a mobile phone, a smart phone, and the like.

What is claimed is:
1. An imaging apparatus comprising:
an interchangeable lens; and a camera body, one of the interchangeable lens and the camera body acting as a master and the other acting as a slave, wherein
the interchangeable lens comprises:
   a correction lens configured to correct an image blur;
   a lens driving unit configured to perform image blur correction by moving the correction lens in a plane perpendicular to an optical axis; and
   a first communication unit configured to communicate with the camera body,
the camera body comprises:
   an imaging device configured to generate image data by imaging an object image which is formed by the interchangeable lens;
   a device driving unit configured to perform the image blur correction by moving the imaging device in a plane perpendicular to the optical axis; and
   a second communication unit configured to communicate with the interchangeable lens, and
the imaging apparatus comprises, at one of the interchangeable lens and the camera body, which acts as the master:
   a shake detection unit configured to detect a shake of at least one of the camera body and the interchangeable lens; and
   a shake correction processing unit configured to calculate an amount of shake correction for the correction lens and the imaging device based on an output from the shake detection unit,
wherein
the shake correction processing unit calculates an amount of image blur correction for the image blur, occurred in the imaging apparatus, and separates the amount of image blur correction into an amount of shake correction corresponding to a shake in a low frequency domain and an amount of shake correction corresponding to a shake in a high frequency domain,
one of the lens driving unit and the device driving unit performs the image blur correction based on the amount of shake correction in the high frequency domain,
the other of the lens driving unit and the device driving unit performs the image blur correction based on the amount of shake correction in the low frequency domain,
the amount of shake correction corresponding to the shake in the low frequency domain is transmitted from the master to the slave between the interchangeable lens and the camera body via the first communication unit and the second communication unit so that the image blur correction is performed based on the amount of shake correction corresponding to the shake in the low frequency domain, and
a communication frequency for transmitting the amount of shake correction is 250 Hz or higher.

2. The imaging apparatus according to claim 1, wherein the shake correction processing unit corrects a phase of the amount of shake correction corresponding to the shake in the high frequency domain according to a phase delay attributed to the transmission of the amount of shake correction corresponding to the shake in the low frequency domain from the master to the slave between the interchangeable lens and the camera body.

3. The imaging apparatus according to claim 1, further comprising a reception unit configured to receive a photographing instruction from a user, wherein
   when the reception unit receives the photographing instruction, the other of the lens driving unit and the device driving unit starts the image blur correction based on the amount of shake correction corresponding to the shake in the low frequency domain, and
   the amount of shake correction corresponding to the shake in the low frequency domain is transmitted from the master to the slave between the interchangeable lens and the camera body via the first communication unit and the second communication unit during a predetermined period from the reception of the photographing instruction.

4. The imaging apparatus according to claim 1, wherein the shake detection unit is provided in the interchangeable lens, and
   the lens driving unit performs the image blur correction based on the amount of shake correction in the high frequency domain, and the device driving unit performs the image blur correction based on the amount of shake correction in the low frequency domain.

5. An interchangeable lens to be mounted to a camera body, the interchangeable lens comprising:
   a correction lens configured to correct an image blur;
   a shake detection unit configured to detect a shake of at least one of the camera body and the interchangeable lens, and output a shake detection signal;
   a shake correction processing unit configured to calculate a shake correction signal for the correction lens and an imaging device based on the output from the shake detection unit; and
   a communication unit configured to transmit to the camera body a low-frequency shake correction signal which is generated as a result of cutting of a predetermined high-frequency component in the shake correction signal, wherein
   a communication frequency for transmitting the low-frequency shake correction signal is 250 Hz or higher.

* * * * *